(12) United States Patent
Brooks et al.

(10) Patent No.: US 7,085,227 B1
(45) Date of Patent: Aug. 1, 2006

(54) METHOD FOR TESTING CONGESTION AVOIDANCE ON HIGH SPEED NETWORKS

(75) Inventors: Roy Brooks, New Hill, NC (US); John Cavanaugh, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 835 days.

(21) Appl. No.: 09/854,384

(22) Filed: May 11, 2001

(51) Int. Cl.
*H04L 12/26* (2006.01)
*G01R 31/28* (2006.01)

(52) U.S. Cl. .................. 370/229; 370/231; 370/235; 714/712

(58) Field of Classification Search ........ 370/229–238, 370/389, 392; 714/47, 712, 74
See application file for complete search history.

(56) References Cited

U.S. PATENT DOCUMENTS

| | | | |
|---|---|---|---|
| 5,193,151 A * | 3/1993 | Jain .......................... | 709/237 |
| 6,215,769 B1 * | 4/2001 | Ghani et al. ................ | 370/230 |
| 6,219,713 B1 * | 4/2001 | Ruutu et al. ................ | 709/235 |
| 6,493,316 B1 * | 12/2002 | Chapman et al. ........... | 370/231 |
| 6,564,267 B1 * | 5/2003 | Lindsay ...................... | 709/250 |
| 6,622,172 B1 * | 9/2003 | Tam ........................... | 709/232 |
| 6,754,228 B1 * | 6/2004 | Ludwig ...................... | 370/468 |
| 6,757,255 B1 * | 6/2004 | Aoki et al. ................. | 370/252 |
| 6,769,030 B1 * | 7/2004 | Bournas ..................... | 709/233 |
| 6,788,704 B1 * | 9/2004 | Lindsay ...................... | 370/465 |

* cited by examiner

*Primary Examiner*—Chau Nguyen
*Assistant Examiner*—Tri H. Phan

(57) ABSTRACT

A method for testing congestion avoidance on a network by simulating transmission control protocol (TCP) streams. In one embodiment, one hundred TCP streams are initiated, wherein each TCP stream is operable to transmit data packets. A TCP stream comprises a current window size and a maximum window size. For each TCP stream, an unacknowledged traffic stream is initiated and directly tied to a referencing TCP stream and is controlled (e.g. rate limited) by the referenced TCP stream. This permits the companion unacknowledged traffic streams to be efficiently transmitted at high rates. In the event of congestion resulting in the dropping of packets from the traffic streams, each traffic stream will back off at the same rate. In one embodiment, an oversubscription factor is used to ensure network congestion causing the associated flow to decrease. The present invention provides for a method of testing congestion avoidance of a high speed network requiring only one processor.

33 Claims, 3 Drawing Sheets

METHOD FOR TESTING CONGESTION AVOIDANCE ON HIGH SPEED NETWORKS

FIELD OF INVENTION

The present invention relates to the field of high speed networks. Specifically, the present invention is a method for testing congestion avoidance on high speed networks.

BACKGROUND OF THE INVENTION

Computer networking technology is progressing at a fast rate. Data transfer speeds that once were considered extremely fast are now considered out of date. High speed networks are used in many situations, both home and business, for access to the Internet. As the bandwidth potential of computer networks grow, through advances such as fiber optic networks, the traffic transmitted across networks grows as well. The increase in traffic often causes network congestion, resulting in the dropping of packets and the backing off of transfer rates. In order to ensure the quality of the data transferred across a network, tools must be used to test the congestion avoidance mechanisms located on routers. A router is a device used to forward packets to the appropriate destination.

Most Internet traffic is acknowledged (e.g. hypertext transfer protocol (HTTP) or file transfer protocol (FTP)). When trying to test congestion avoidance mechanisms, current testing technology utilizes acknowledged data streams. Congestion avoidance mechanisms operate by selectively or randomly dropping packets in different queues, expecting the data flows to back off to account for the dropped packets.

Current test tools, both internal and external, lack the ability to produce enough real traffic streams to saturate and oversubscribe high speed networks (e.g., above 1 GB) with acknowledged protocols. When a test set attempts to send very large amounts of traffic on a typical network, the traffic backs off as the network gets saturated. However, when a test set attempts to send very large amounts of traffic on a high speed network, there no back off as the traffic sent is not enough to saturate the high speed networks. Traffic continues to be sent at the same rate, so congestion avoidance mechanisms do not work and the actual performance of the router cannot be tested.

Current technology is sufficient to handle low speed networks, but not high speed networks, such as those offered under fiber optic networks. Under the current testing technology, thousands or millions of flows of traffic must be simulated to test congestion avoidance of high speed networks. To actually simulate millions of flows of traffic would take hundreds or thousands of processors to create the streams and acknowledge the packets when they are received at the destination. Likewise, vast amounts of processors are required to simulate actual Internet traffic.

Accordingly, a need exists for a method for testing the congestion avoidance mechanism of a router for high speed networks. Furthermore, a need exists for a method that simulates present and future Internet traffic on high speed networks and determines how the Internet traffic affects the congestion avoidance mechanism of the router. Furthermore, a need exists for such a method that requires minimal hardware and is thus commercially economical.

SUMMARY OF THE INVENTION

The present invention provides a method for testing the congestion avoidance mechanism of a router for high speed networks by simulating transmission control protocol (TCP) streams. The present invention also provides a method for simulating present and future Internet traffic on high speed networks and determining how the Internet traffic affects the congestion avoidance mechanism of the router. Furthermore, the present invention allows for having streams of data that can vary their respective rates based in the success of delivery. The present invention requires the use of only one processor, and is thus commercially economical.

A method for testing congestion avoidance on a network by simulating transmission control protocol (TCP) streams is described. In one embodiment, one hundred TCP streams are initiated, wherein each TCP stream is operable to transmit data packets. A TCP stream comprises a current window size and a maximum window size. For each TCP stream, an unacknowledged traffic stream is initiated and directly tied to a referencing TCP stream and is controlled (e.g. rate limited) by the referenced TCP stream. This permits the companion unacknowledged traffic streams to be efficiently transmitted at high rates. In the event of congestion resulting in the dropping of packets from the traffic streams, each traffic stream will back off at the same rate.

In one embodiment, the current window size is divided by the maximum window size resulting in a success ratio. The success ratio indicates the relative success of packet transmissions (e.g. the lower the success ratio, the greater the number of packets being dropped in transmission).

In one embodiment, the success ratio is multiplied by an oversubscription factor, resulting in a first value. The oversubscription factor is used to ensure network congestion causing the associated flow to decrease. The first value is divided by the number of TCP streams initiated, resulting in a second value. The second value is multiplied by the link speed, resulting in a stream rate. The link speed is defined by the bandwidth of a network wherein the TCP streams are transmitted, and the stream rate is defined as the transfer rate for each TCP stream.

The present invention provides a method for testing the congestion avoidance mechanism on a router requiring the use of only one processor. As a result, the present invention provides the ability to test congestion avoidance mechanisms previously unable to be tested, as they were commercially unaffordable.

Furthermore, the present invention provides a method for simulating future network traffic flow for analyzing how the router will be affected. Thus, stream rates not presently seen on the Internet can be accounted, allowing for analysis of future network needs.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
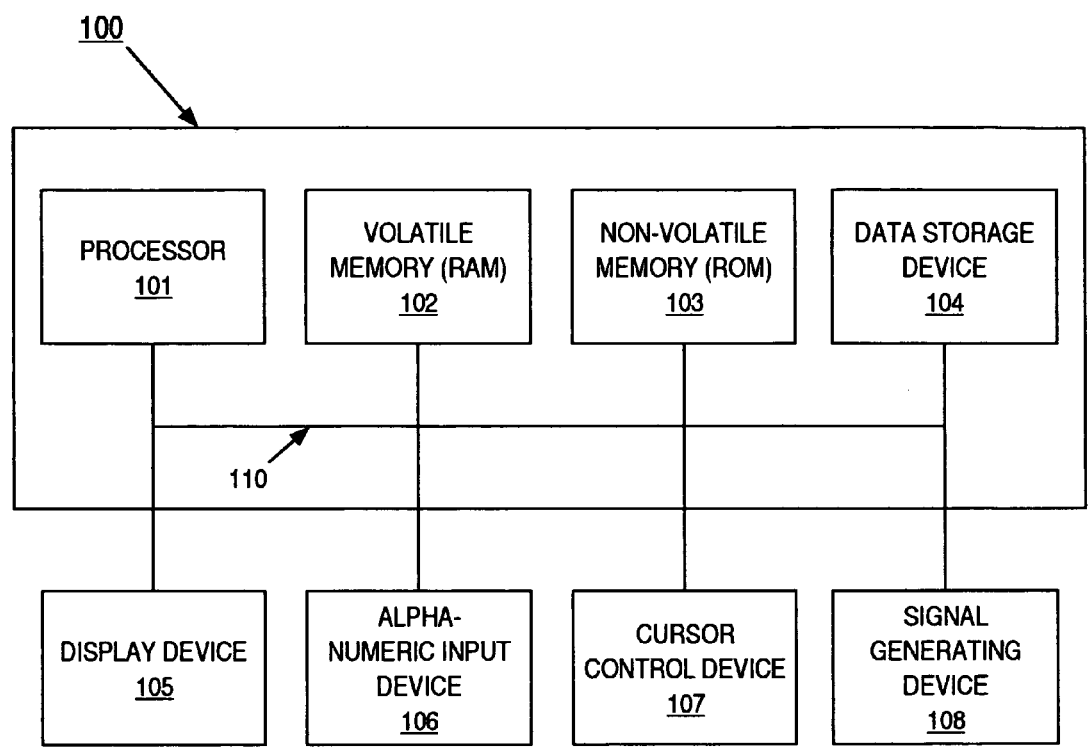
FIG. 1 illustrates an exemplary computer system platform upon which embodiments of the present invention may be practiced.

Refer now to FIG. 1 which illustrates an exemplary computer system 100 upon which embodiments of the present invention may be practiced. In general, computer system 100 comprises bus 110 for communicating information, processor 101 coupled with bus 110 for processing information and instructions, random access (volatile) memory (RAM) 102 coupled with bus 110 for storing information and instructions for processor 101, read-only (non-volatile) memory (ROM) 103 coupled with bus 110 for storing static information and instructions for processor 101, data storage device 104 such as a magnetic or optical disk and disk drive coupled with bus 110 for storing information and instructions.

In one embodiment, computer system 100 comprises an optional user output device such as display device 105 coupled to bus 110 for displaying information to the computer user, an optional user input device such as alphanumeric input device 106 including alphanumeric and function keys coupled to bus 110 for communicating information and command selections to processor 101, and an optional user input device such as cursor control device 107 coupled to bus 110 for communicating user input information and command selections to processor 101. Furthermore, an optional input/output (I/O) device 108 is used to couple computer system 100 onto, for example, a network.

Display device 105 utilized with computer system 100 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
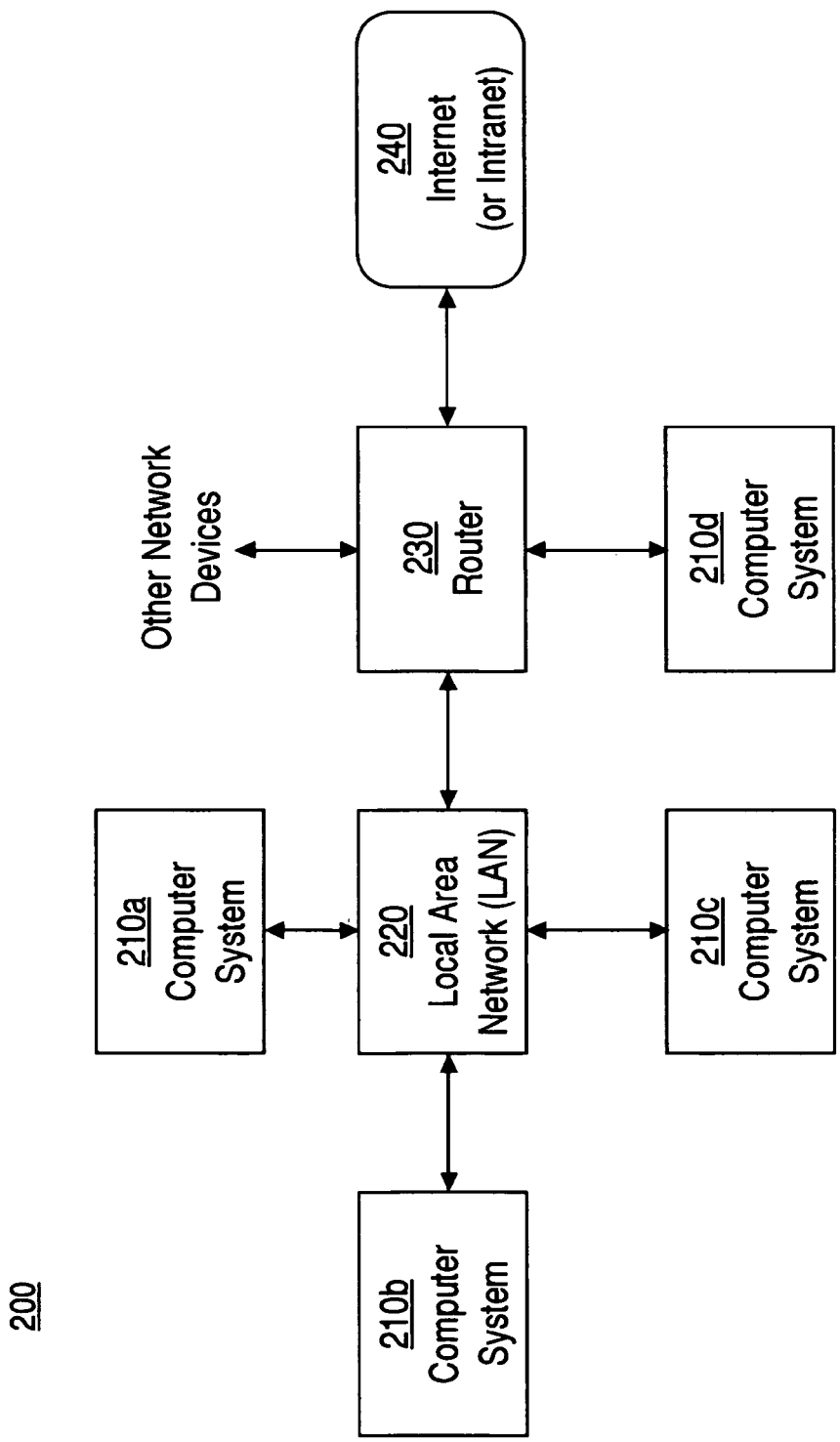
FIG. 2 is a block diagram of one embodiment of a computer system network upon which the present invention may be implemented.

FIG. 2 is a block diagram of computer systems 210a, 210b, 210c and 210d coupled in an exemplary computer system network ("network") 200 upon which embodiments of the present invention may be implemented. Computer systems 210a, 210b, 210c and 210d may be physically in separate locations (e.g., remotely separated from each other). In one embodiment, computer systems 210a, 210b and 210c are communicatively coupled in a local area network (LAN) 220.

Computer systems 210a, 210b, 210c and 210d are coupled to router 230. In one embodiment, computer systems 210a, 210b and 210c are communicatively coupled to router 230 through LAN 220. To avoid unnecessarily obscuring aspects of the present invention, the present embodiment of network 200 is described using routers; however, it is appreciated that a combination of routers, switches, computer systems or like devices (exemplified by computer system 100 of FIG. 1) can be utilized for handling and distributing network traffic in accordance with the present invention.

Network 200 may represent a portion of a communication network located within a firewall of an organization or corporation (an "Intranet"), or network 200 may represent a portion of the World Wide Web or Internet 210. The mechanisms for coupling computer systems 210a, 210b, 210c and 210d over the Internet (or Intranet) 240 are well known in the art. In the present embodiment, standard Internet protocols like IP (Internet Protocol), TCP (Transmission Control Protocol), HTTP (Hypertext Transfer Protocol) and SSL (Secure Sockets Layer) are used to transport data between clients and servers, in either direction. However, the coupling of computer systems 210a, 210b, 210c and 210d can be accomplished over any network protocol that supports a network connection, including NetBIOS, IPX (Internet Packet Exchange), and LU6.2, and link layers protocols such as Ethernet, token ring, and ATM (Asynchronous Transfer Mode).

In one embodiment, the physical coupling of computer systems 210a, 210b, 210c and 210d over the Internet (or Intranet) 240 is by a fiber optic network. Fiber optic networking is a technology that uses glass (or plastic) threads (fibers) to transmit data. A fiber optic cable consists of a bundle of glass threads, each of which is capable of transmitting messages modulated onto light waves. Fiber optic cables have a much greater bandwidth than metal cables and allow for the digital transmission of data. Fiber optic cabling is commonly used in LANs (e.g., LAN 220 of FIG. 2).

Optical carrier (OC) levels are used to specify the speed of fiber optic networks. In one embodiment, the present invention is configured to operate at a line speed of OC-12 (622.08 megabytes per second). In another embodiment, the present invention is configured to operate at a line speed of OC-192 (10 gigabytes per second). It should be appreciated that the present invention is configurable to operate at all line speed ranging from OC-12 through OC-192.

Figure 3:
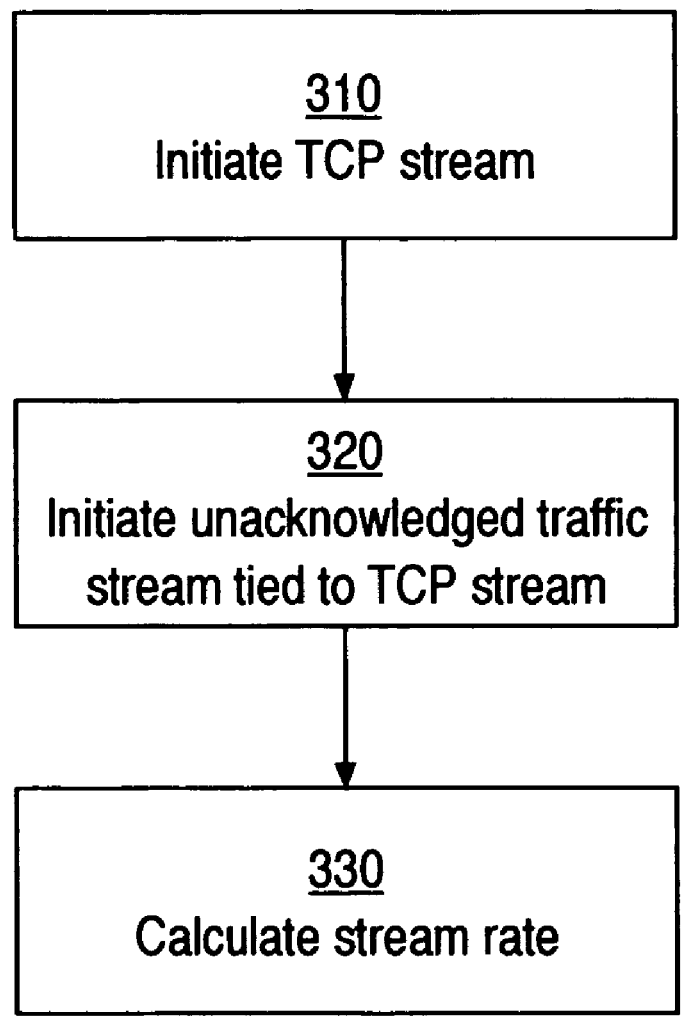
FIG. 3 shows a flowchart diagram of a process for simulating Internet traffic on high speed networks for use in testing congestion avoidance mechanisms in accordance with one embodiment of the present invention.

FIG. 3 shows a flowchart diagram of a process 300 for simulating Internet traffic on high speed networks for use in testing congestion avoidance mechanisms in accordance with one embodiment of the present invention.

At step 310, at least one transmission control protocol (TCP) stream (e.g. session) is initiated. In one embodiment, one hundred TCP streams are initiated. A TCP stream operates to transmit data packets. A TCP stream comprises a current window size and a maximum window size, wherein the current window size defines an amount of data actually being sent, and the maximum window size defines a maximum amount of data that can be sent. In one embodiment, the maximum window size is sixty-five kilobytes.

Essential to the operation of a TCP transmission is the acknowledgement mechanism. When data arrives at the recipient, the protocol requires that it send back an acknowledgement of this data. TCP specifies that the bytes of data sent are sequentially numbered so that the recipient acknowledges data by identifying the first byte of data which it has not yet received.

The window size mechanism is a flow control tool. The recipient of data returns to the sender a number, which is approximately the size of the buffer which the receiver currently has available for additional data. This number of bytes, called the maximum window size, is the maximum which the sender is permitted to transmit until the receiver returns some additional window. Sometimes, the receiver will have no buffer space available, and will return a window value of zero. It should be appreciated that the current window size varies while the maximum window size remains a constant. Under these circumstances, the protocol requires the sender to send a small segment to the receiver periodically, to see if more data is accepted. If the window remains closed at zero for some substantial period, and the sender can obtain no response from the receiver, the protocol requires the sender to conclude that the receiver has failed, and to close the connection.

At step 320, an unacknowledged traffic stream is initiated for each TCP stream. The unacknowledged traffic stream is controlled by the TCP stream such that the unacknowledged traffic stream simulates acknowledged traffic streams.

In one embodiment, the sender starts by transmitting one segment and waiting for its acknowledgment. When that acknowledgment is received, the current window size is incremented from one to two, and two segments can be sent. When each of those two segments is acknowledged, the congestion window is increased to four. This provides an exponential growth, although it is not exactly exponential because the receiver may delay its acknowledgment, typically sending one acknowledgment for every two segments that it receives. It should be appreciated that the growth of the transfer rate need not be exponential, rather any growth rate will suffice. When the capacity of the Internet is reached an intermediate router will start discarding packets. This notifies the sender that its current window size has gotten too large, and packets are being dropped.

When performance testing is done on a router and the queuing is based on a congestion avoidance process, packets are dropped when the queues are filling. This causes an acknowledged stream to decrease the current window size and retransmit the data, thus decreasing the congestion. If packets from an unacknowledged stream are dropped, the sender continues to send and the congestion would continue. This causes the queues to continue to fill and then drop all traffic beyond the max queue depth.

In one embodiment, the unacknowledged traffic stream operates at a significantly higher rate than the referencing TCP stream. In the event of a TCP stream dropping a packet, the TCP stream to go through a time-out interval and retransmit the data at a lower speed. The accompanying unacknowledged high speed stream will back off at the same rates as the TCP stream, thus simulating acknowledged traffic.

In one embodiment, as stated above, one hundred TCP streams are initiated. In the present embodiment, in the event of one TCP stream being completely lost, the throughput is only affected by 1.0%. Increasing the number of TCP streams can increase the accuracy. For example, if 200 TCP streams are initiated and one is lost completely, the throughput is only affected by 0.5%.

The present invention, by using TCP streams in conjunction with unacknowledged streams, permits a single processor to simulate Internet traffic over a high speed network. By simulating Internet traffic over a high speed network, the present invention provides a method for testing congestion avoidance mechanisms.

At step 330, the stream rate for each unacknowledged stream is calculated. The equation used for calculating the stream rate is represented in Equation 1, where the current window size is the amount of unacknowledged data actually being sent by a TCP stream, maximum window size is the maximum amount of unacknowledged data that can be sent per TCP stream, the oversubscription rate is a predefined factor for ensuring that the network gets congested, the link speed is the bandwidth of the network wherein the traffic is being sent, and the number of streams is the number of TCP sessions initiated.

$$\text{stream rate} = \left(\frac{\text{current window size}}{\text{maximum window size}}\right) \frac{\text{oversubscription rate} * \text{link speed}}{\text{number of streams}} \quad \text{Equation 1}$$

In one embodiment, the current window size is divided by the maximum window size resulting in a success ratio. The success ratio indicates the relative success of packet transmissions (e.g. the lower the success ratio, the greater the number of packets being dropped in transmission).

In one embodiment, the oversubscription rate is used to ensure that the network link is congested. The oversubscription rate operates by assuming that more than 100% of the theoretical maximum traffic is needed to congest the link. By guaranteeing congestion, packets are certain to be dropped, resulting in a back off of the stream rate. As the flow decreases, some congestion is removed. In one embodiment, the oversubscription factor is 1.1 (e.g. the stream rate is increased by 10%.

For example, consider the situation of a maximum window size of 65 KB, a link speed of 10 GB, an oversubscription rate of 1.1 and 100 initiated streams. It should initially be appreciated that for a 10 GB link transmitting 100 streams, each stream travels at a stream rate of 100 MBps. At the beginning of the data transfer, the current window size is ramped up continually as packets are successfully transmitted. As the current window size begins to approach the maximum window size (e.g., the success ratio approaches one) the oversubscription rate affects the number of successfully transmitted packets. The oversubscription rate affects the stream rate by attempting to transmit data at a rate of greater than 100 MBps. Since this is not possible due to the limits of the 10 GB link, packets are lost. So as to not lose packets, the TCP stream backs off, compensating for the oversubscription rate. The current example, as shown in Equation 2, limits the current window size to 59.1 KB. If the current window size exceeds 59.1 KB packets are lost, and the traffic stream backs off so as to not lose packets.

$$\left(\frac{\text{current window size}}{65 \text{ KB}}\right) \frac{1.1 * 10 \text{ GB}}{100 \text{ streams}} = 100 \text{ MBps} \quad \text{Equation 2}$$

$$\text{current window size} = 59.1 \text{ KB}$$

The present invention provides a method for simulating connections at very high rates without requiring millions of TCP streams. By tying one TCP stream to an unacknowledged stream that is amplified hundreds of times faster, the present invention allows for the testing of high speed networks. The TCP stream knows when the unacknowledged stream has dropped a packet, thus allowing the stream to back off in the event of congestion.

The preferred embodiment of the present invention, a method for testing congestion avoidance on high speed networks, is thus described. While the present invention has been described in particular embodiments, it should be appreciated that the present invention should not be construed as limited by such embodiments, but rather construed according to the below claims.

What is claimed is:

1. In a network, a method for simulating transmission control protocol streams, said method comprising the steps of:
   a) initiating at least one transmission control protocol session, said transmission protocol session requiring acknowledgement and operable to transmit data packets, said transmission control protocol session comprising a current window size and a maximum window size, said current window size defining an amount of unacknowledged data actually being sent, said maximum window size defining an amount of unacknowledged data that can be sent; and
   b) initiating an unacknowledged traffic stream for the transmission control protocol session, wherein said unacknowledged traffic stream does not require acknowledgement and is controlled by said transmission control protocol session such that said unacknowledged traffic stream simulates an acknowledged traffic stream.

2. The method as recited in claim 1 wherein said method is configured to operate on a high speed network.

3. The method as recited in claim 2 wherein said high speed network is configured to operate on a fiber optic network.

4. The method as recited in claim 1 further comprising the step of dividing said current window size by said maximum window size resulting in a success ratio, said success ratio indicating the relative success of packet transmissions.

5. The method as recited in claim 4 further comprising the steps of:
   multiplying said success ratio by an oversubscription factor resulting in a first value, said oversubscription factor operable to create network congestion;
   dividing said first value by the number of said transmission control protocol session initiated in step a) of said method resulting in a second value; and
   multiplying said second value by a link speed resulting in a stream rate, said link speed defined by the bandwidth of a network wherein said transmission control protocol sessions reside, said stream rate defined as the transfer rate for said transmission protocol session.

6. The method as recited in claim 1 wherein said maximum window size is sixty-five kilobytes.

7. The method as recited in claim 1 wherein one hundred transmission control protocol sessions are initiated.

8. The method as recited in claim 5 wherein said oversubscription factor is 1.1.

9. The method as recited in claim 5 wherein said link speed is 10 gigabytes.

10. A computer system in a computer system network, said computer system comprising:
    a bus;
    a memory unit coupled to said bus; and
    a processor coupled to said bus, said processor for simulating transmission control protocol streams in a network, wherein said processor initiates at least one transmission control protocol session, said transmission protocol session requiring acknowledgement and operable to transmit data packets, said transmission control protocol session comprising a current window size and a maximum window size, said current window size defining an amount of unacknowledged data actually being sent, said maximum window size defining an amount of unacknowledged data that can be sent, and wherein said processor initiates an unacknowledged traffic stream for the transmission control protocol session, wherein said unacknowledged traffic stream does not require acknowledgement and is controlled by said transmission control protocol session such that said unacknowledged traffic stream simulates an acknowledged traffic stream.

11. The computer system as recited in claim 10 wherein said simulating transmission control protocol streams in a network is configured to operate on a high speed network.

12. The computer system as recited in claim 11 wherein said high speed network is configured to operate on a fiber optic network.

13. The computer system as recited in claim 10 wherein said processor further divides said current window size by said maximum window size resulting in a success ratio, said success ratio indicating the relative success of packet transmissions.

14. The computer system as recited in claim 13 wherein said processor further multiplies said success ratio by an oversubscription factor resulting in a first value, said oversubscription factor operable to create network congestion, divides said first value by the number of said transmission control protocol sessions initiated resulting in a second value, and multiplies said second value by a link speed resulting in a stream rate, said link speed defined by the bandwidth of a network wherein said transmission control protocol sessions reside, said stream rate defined as the transfer rate for said transmission protocol session.

15. The computer system as recited in claim 10 wherein said maximum window size is sixty-five kilobytes.

16. The computer system as recited in claim 10 wherein one hundred transmission control protocol sessions are initiated.

17. The computer system as recited in claim 14 wherein said oversubscription factor is 1.1.

18. The computer system as recited in claim 14 wherein said link speed is 10 gigabytes.

19. A computer-usable medium having computer readable program code embodied therein for causing a computer system to perform the steps of:
    a) initiating at least one transmission control protocol session, said transmission protocol session requiring acknowledgement and operable to transmit data packets, said transmission control protocol session comprising a current window size and a maximum window size, said current window size defining an amount of unacknowledged data actually being sent, said maximum window size defining an amount of unacknowledged data that can be sent; and
    b) initiating an unacknowledged traffic stream for the transmission control protocol session, wherein said unacknowledged traffic stream does not require acknowledgement and is controlled by said transmission control protocol session such that said unacknowledged traffic stream simulates an acknowledged traffic stream.

20. The computer-usable medium as recited in claim 19 wherein said program code is configured to operate on a high speed network.

21. The computer-usable medium as recited in claim 20 wherein said high speed network is configured to operate on a fiber optic network.

22. The computer-usable medium as recited in claim 19 wherein said computer readable program code embodied therein for causes a computer system to perform the step of dividing said current window size by said maximum window size resulting in a success ratio, said success ratio indicating the relative success of packet transmissions.

23. The computer-usable medium as recited in claim 22 wherein said computer readable program code embodied therein for causes a computer system to perform the steps of:
multiplying said success ratio by an oversubscription factor resulting in a first value, said oversubscription factor operable to create network congestion;
dividing said first value by the number of said transmission control protocol session initiated in step a) of said method resulting in a second value; and
multiplying said second value by a link speed resulting in a stream rate, said link speed defined by the bandwidth of a network wherein said transmission control protocol sessions reside, said stream rate defined as the transfer rate for said transmission protocol session.

24. The computer-usable medium as recited in claim 19 wherein said maximum window size is sixty-five kilobytes.

25. The computer-usable medium as recited in claim 19 wherein one hundred transmission control protocol sessions are initiated.

26. The computer-usable medium as recited in claim 23 wherein said oversubscription factor is 1.1.

27. The computer-usable medium as recited in claim 23 wherein said link speed is 10 gigabytes.

28. A method for testing congestion avoidance on a network comprising the steps of:
a) initiating at least one transmission control protocol session, said transmission protocol session requiring acknowledgement and operable to transmit data packets, said transmission control protocol session comprising a current window size and a maximum window size, said current window size defining an amount of unacknowledged data actually being sent, said maximum window size defining an amount of unacknowledged data that can be sent;
b) initiating an unacknowledged traffic stream for the transmission control protocol session, wherein said unacknowledged traffic stream is controlled by said transmission control protocol session such that said unacknowledged traffic stream simulates an acknowledged traffic stream;
c) dividing said current window size by said maximum window size resulting in a success ratio, said success ratio indicating the relative success of packet transmissions;
d) multiplying said success ratio by an oversubscription factor resulting in a first value, said oversubscription factor operable to create network congestion;
e) dividing said first value by the number of said transmission control protocol session initiated in step a) of said method resulting in a second value; and
f) multiplying said second value by a link speed resulting in a stream rate, said link speed defined by the bandwidth of a network wherein said transmission control protocol sessions reside, said stream rate defined as the transfer rate for said transmission protocol session.

29. The method as recited in claim 28 wherein said high speed network is configured to operate on a fiber optic network.

30. The method as recited in claim 28 wherein said maximum window size is sixty-five kilobytes.

31. The method as recited in claim 28 wherein one hundred transmission control protocol sessions are initiated.

32. The method as recited in claim 28 wherein said oversubscription factor is 1.1.

33. The method as recited in claim 28 wherein said link speed is 10 gigabytes.

* * * * *